United States Patent [19]
Dach et al.

[11] 3,765,271
[45] Oct. 16, 1973

[54] GEAR SHIFT CONTROL SYSTEM

[76] Inventors: Hansjörg Dach, Friedrichshafen;
Günter Gackstetter, Langenargen, both of Germany

[22] Filed: Feb. 28, 1972

[21] Appl. No.: 229,858

Related U.S. Application Data
[63] Continuation-in-part of Ser. No. 60,387, Aug. 3, 1970, Pat. No. 3,710,647.

[52] U.S. Cl. ............................................... 74/731
[51] Int. Cl. ........................................... F16h 47/00
[58] Field of Search ...................................... 74/731

[56] References Cited
UNITED STATES PATENTS 3,683,720   8/1972   Wakamatsu et al. ................. 74/731
3,640,152   2/1972   Shirai et al. .......................... 74/752

*Primary Examiner*—Leonard H. Gerin
*Attorney*—Zalkind, Horne & Shuster

[57] ABSTRACT

An electro-mechanical system is utilized to control changes in the drive ratio of a vehicle engine driven transmission in response to changes in torque input and output of a fluid transmitter and vehicle speed. Speed sensors develop electric signals representing input data fed to a computer programmed in accordance with the characteristics of the fluid transmitter and vehicle speed to actuate the gear ratio changing mechanisms.

10 Claims, 5 Drawing Figures

GEAR SHIFT CONTROL SYSTEM

This application is a continuation-in-part of prior co-pending application, U.S. Pat. Ser. No. 60,387, filed Aug. 3, 1970, now U.S. Pat. No. 3,710,647.

In prior art devices automatic transmission control has been effected as a function of speed of the vehicle and engine load by generating fluid signal pressures with the engine load or torque being represented by fluid pressure proportional to throttle valve setting, or a load setting, or intake pressure, etc. Such prior art systems taken in any form or combination of components do not take into account the effect on input torque to the drive ratio determining gearing by the fluid transmitter.

Thus, in prior art systems pressures are developed approximately proportional to the driving torque input to the fluid transmitter which must be raised to substantially higher pressures after changes in gear ratios with no change of torque in the fluid transmitter. Accordingly, a pump is required to develop a seldom used pressure necessary at the time of maximum torque conversion in the fluid transmitter.

The present invention seeks to overcome the disadvantages of the prior art namely poor correspondence of torque in the gearing with actual control conditions needed for accurate ratio change control and thereby avoids large friction clutches or brakes, and supplemental devices, in the transmission otherwise needed to effect smooth shifting or change in drive ratio.

Briefly, the invention provides a system wherein a computer produces an electrical output signal of a magnitude dependent on the drive torque, driven torque, and the ratio of the driven and drive speeds of the fluid transmitter. Such computer output signal of a particular magnitude is determined from electrical signals which are proportional to converter or fluid coupling drive speed and driven speed, wherein the characterizing data of the particular fluid drive is programmed into the computer. The computer output is processed through a suitable control device to which a vehicle speed signal is fed whereby control signals are established for actuation of solenoid valves in a hydraulic drive ratio control system wherein a pressure proportional to the torque output of the fluid drive is utilized.

An essential advantage of the invention as compared to the prior art systems which utilize engine torque for developing gear shifting pressures proportional to load is that in the present invention such actuating pressure is not proportional to the engine torque but rather to the output torque of the fluid transmitter as determined by a computer programmed in accordance with the characteristics of said fluid transmitter.

A detailed description of the invention now follows in conjunction with the appended drawing in which.

Figure 1:
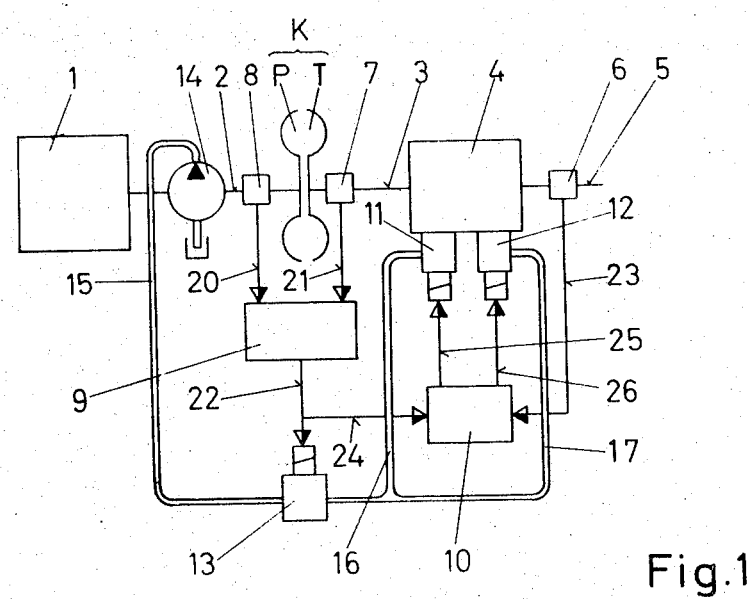
FIG. 1 is a diagrammatic illustration of a system utilizing a fluid coupling.

Referring to FIG. 1, the diagram depicts engine 1 connected by means of an output shaft 2 with the impeller P of a fluid transmitter such as the fluid coupling K having the turbine T connected by shaft 3 to a mechanical gear train or mechanism in gear box 4. A pressure control valve 13 is connected to an oil pump 14 by a pressure conduit 15, the oil pump being driven by the engine output shaft 2. Valve 13 is a solenoid controlled type of valve for varying the pressure of fluid supplied to conduit 17. Also mounted on the shaft 2 is a speed measuring sensor 8 which develops an electrical signal proportional to the drive speed of the Pump P of the fluid coupling K. Such signal may be an analogue of the engine speed $n_1$ or the variable output voltage or current of an electrical generator or a speed responsive reostat or the output of any other well known device. Alternatively, the signal may be in the form of the electrical pulse output of a pulse generator at a frequency proportioned to engine speed. The signal proportional to the drive speed $n_1$ is applied as an input via electrical connection 20 to a computer 9. In a similar manner, a sensor 7 on shaft 3 sends an input electrical signal via electrical connection 21 to computer 9, a signal which is proportional to the driven speed $n_2$ of the turbine T in the coupling K.

A further sensor 6 on the gear output shaft 5 provides an electrical signal having a magnitude proportional to the vehicle travel speed V, such signal being conducted via connection 23 to an electrical control device 10 comprisng an electronic switch.

The computer is programmed in accordance with the formula:

$$M_2 = c \cdot \mu \cdot n_1^2 \quad c = f_c\ (n2)/(n_1),\ \mu = f\mu\ (n2)/(n1)$$

where $M_2$ is the output torque of fluid transmitter K, C is the dimensional factor for the input of the fluid transmitter and is the conversion factor for the specific type of fluid transmitter. Torques can be in any convenient units. The factors C and are dependent on the ratio of the output and input speeds $(n_2/n_1)$ programmed into the computer 9. The computer output is an electrical signal of magnitude proportional to output torque $M_2$.

The electrical signal at the computer output actuates or controls valve 13 via electrical connection 22. An output also is transmitted to the electrical control device 10 via connection 24. The speed sensor 6 also transmits a speed signal via line 23 to the control device 10.

Pressure from pump 14 is thus controlled at valve 13 proportional to the torque output $M_2$ of the coupling K and such pressure, either hydraulic or pneumatic, is conducted by conduits 16 and 17 to respective solenoid valves 11 and 12. The gear ratio determining valves 11 and 12 are independently controlled by output signals from the control device 10 via respective electrical connections 25 and 26.

Accordingly, depending upon output signals from control device 10, the valves 11 and 12 are energized for effecting shifting of gears in the gear box 4 by application of drive ratio establishing mechanism such as brakes, clutches, and the like, in a conventional manner. Valves 11 and 12 are solenoid controlled to supply fluid under pressure to the drive ratio changing mechanism in the gear box, all in a conventional manner.

The embodiment shown in FIG. 2 utilizes a torque converter G, as the fluid transmitter, and reference characters in FIG. 2 correspond as to like components to those heretofore described in FIG. 1, except as noted below. Thus, in FIG. 2 there is no direct sensing of the speed $n_2$, the output speed of the converter, it being noted that there is no sensor 7 in FIG. 2 as there is in FIG. 1. However, the output speed of the converter is derived as a function of the vehicle speed sensed by the sensor 6 and the drive ratio condition of the gear box 4. Thus, the electrical output signal from that sensor 6 is fed to a control device $10^1$ and such control device has an output connection 28 to the computer 9. Such derivation of an output signal for $n_2$ occurs in the control device $10^1$ and, accordingly, the output signal in connection 28 to the computer 9 is essentially the same signal which the computer 9 in FIG. 1 receives from the sensor 7 via connection 21.

Figure 2:
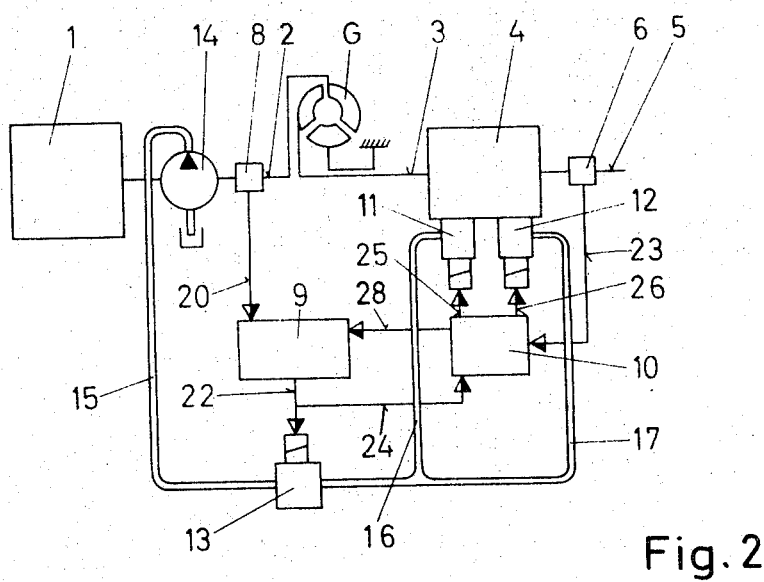
FIG. 2 is a diagrammatic illustration of a system using a torque converter.

Accordingly, the modification of FIG. 2 operates as set forth for FIG. 1, except for $N_2$ being indirectly provided as an electrical signal to the computer input.

Figure 3:
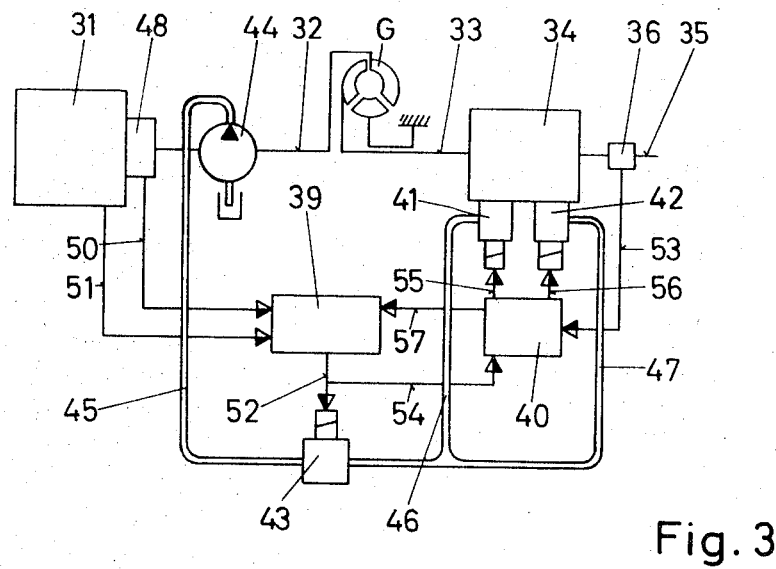
FIG. 3 is a diagrammatic illustration of a modified system using a torque converter.

In the form of the invention shown in FIG. 3, a torque converter G is again utilized and most components shown are similar to those shown in FIG. 2 with, however, certain exceptions. In FIG. 3 the engine 31 has a pulse generator component 48 which sends a signal proportional in frequency to engine rpm $n_1$ via line 50 to a computer 39 while a signal proportional to engine torque $M_1$ goes to the computer via connection 51. The output speed $n_2$ of the converter G is determined as in the embodiment of FIG. 2. Also, on driven shaft 35 there is a sensor 36 which sends an electrical signal proportional to vehicle speed V via the line 53 to the electrical control device 40. The electrical control device 40 receiving such signal and being set for a particular drive ratio in the gear box 34 by the signal input from computer 39 through line 54, generates an output signal which passes to computer 39 via connection 57, such output signal from control device 40 being proportional to the output speed $n_2$ of the converter output shaft 33. The output of computer 39 is connected via electrical connection 52 to control valve 43 and also to the control device 40. The control device 40 is thus conditioned to energize valves 41 and 42 via respective electrical connections 53 and 56 in the output of the control device to effect gear shifting or drive ratio change in gear box 34 in accordance with signals received via connections 53 and 54.

Pressure fluid for the valves comes from pump 44 driven by the converter input shaft 32 and connected via a conduit 45 to control valve 43 and thence via lines 46 and 47 to the respective valves 41 and 42. The pressure of the fluid delivered by valve 43 is a function of the value of the torque output $M_2$ of converter G, similarly to the operation of valve 13 in FIGS. 1 and 2.

In contrast to the forms of the invention in FIGS. 1 and 2 the modification of FIG. 3 utilizes a torque output $M_2$ determined from engine torque $M_1$ which is determinable in various ways as by throttle valve setting or intake manifold pressure measured by an inductive sensor or from some other variable control or characteristic of the engine. In the modification of FIG. 3 the computer 39 is programmed in accordance with the equation $M_2 = M_1 \cdot \mu \cdot (n_2)/n_1$ wherein $M_1$ replaces the variable function C in the equation for which computer 9 is programmed and such computer 39 is therefore less expensive than the computer 9 of FIGS. 1 and 2. Further, the form shown in FIG. 3 is intended for fuel injection engines now coming into vogue replacing the usual carburetor. The component 48 is an engine driven pulse transmitter having a signal frequency proportional to engine rpm.

Figure 1A:
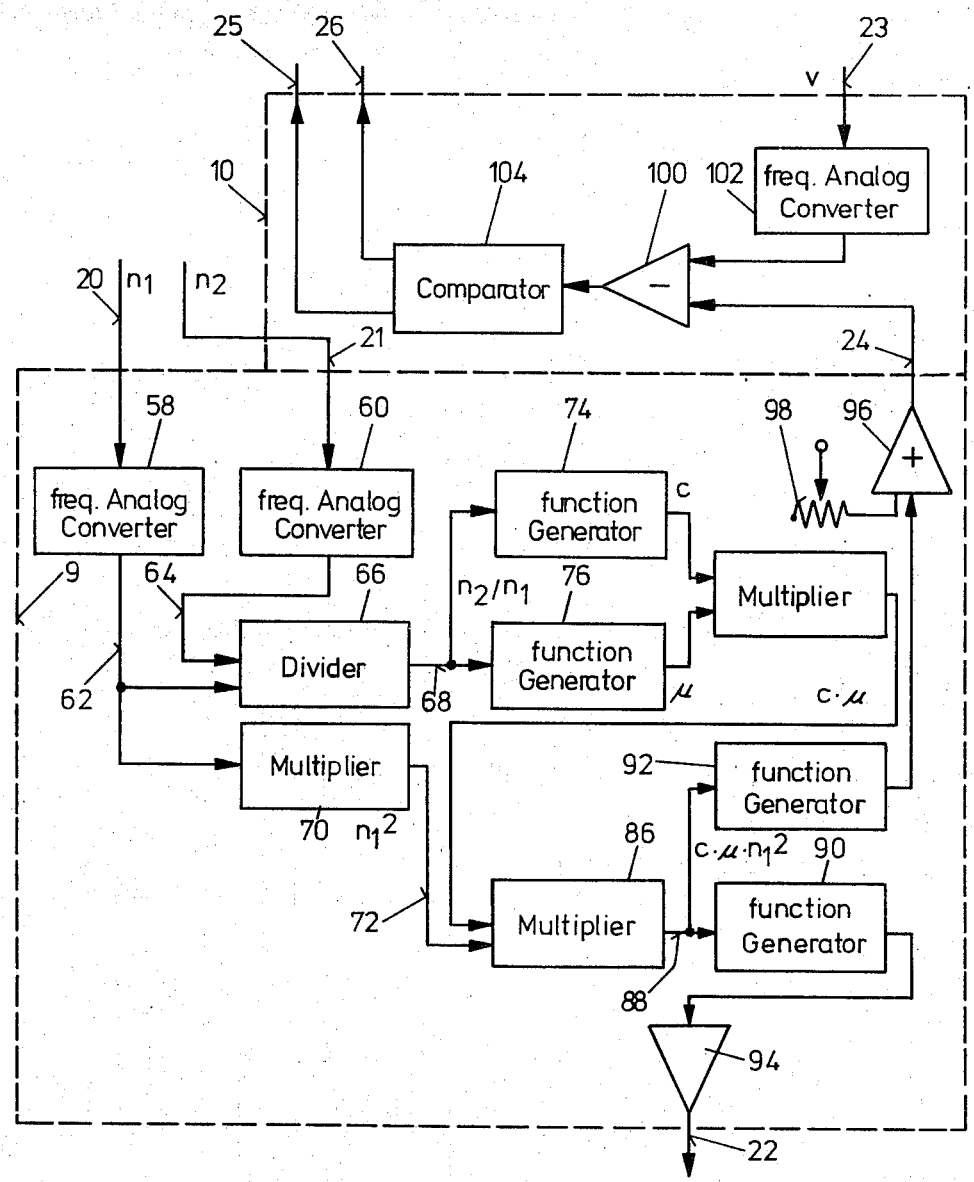
FIG. 1A is a diagrammatic illustration of the control circuitry associated with the computer and electronic switch of FIG. 1.

FIG. 1A diagrammatically illustrates the computer 9 of FIG. 1 programmed to produce an analog output representing a predetermined function of the input speed variables $N_1$ and $N_2$ hereinbefore denoted by the expression $C \cdot \mu \cdot N_1^2$, wherein C and $\mu$ are different functions of the variable ratio $N_2/N_1$. Assuming the frequency of the input signals in lines 20 and 21 represent speed values $N_1$ and $N_2$, these inputs are processed by frequency analog converters 58 and 60 to produce output voltages in lines 62 and 64 proportioned in magnitude to the speed values $N_1$ and $N_2$. These input speed signal voltages are fed to divider component 66 to produce a quotient output voltage representing the ratio $N_2/N_1$ in line 68. The output line 62 of converter 58 is furthermore fed to multiplier 70 from which a squared input voltage value representing $N_1^2$ is obtained in line 72. The speed ratio voltage in line 68 is fed to a pair of function generators 74 and 76 from which voltage outputs representing the factors c and $\mu$ are obtained in lines 78 and 80 and fed to multiplier 82 to produce the product voltage in line 84 representing $(C)(\mu)$. The signal voltages in lines 72 and 84 are fed to multiplier 86 from which the basic computer output voltage is obtained in line 88 representing the output torque $M_2$ equal to $C \cdot \mu \cdot N_1^2$. The output voltage is fed by line 88 to function generators 90 and 92 from which output signals are fed through amplifier 94 and line 22 to the pressure control valve 13 and to the summing amplifier 96 to which adjustment potentiometer 98 is also connected. The output sum computed by amplifier 96 is adjusted through potentiometer 98 to select the drive ratio switching points in the electronic switch component 10 to which the output of the amplifier 96 is connected by line 24.

The component 10 as also shown in FIG. 1A, includes a subtracting amplifier 100 receiving as inputs the output of computer 9 through line 24 representing the output torque value $(C \cdot \mu \cdot N_1^2)$ and a vehicle speed signal voltage from the converter 102 to which input line 23 is connected from sensor 6. The difference between the two inputs to amplifier 100 is fed to a comparator 104 from which valves 11 and 12 are alternately actuated by output voltages in the lines 25 and 26.

Figure 3A:
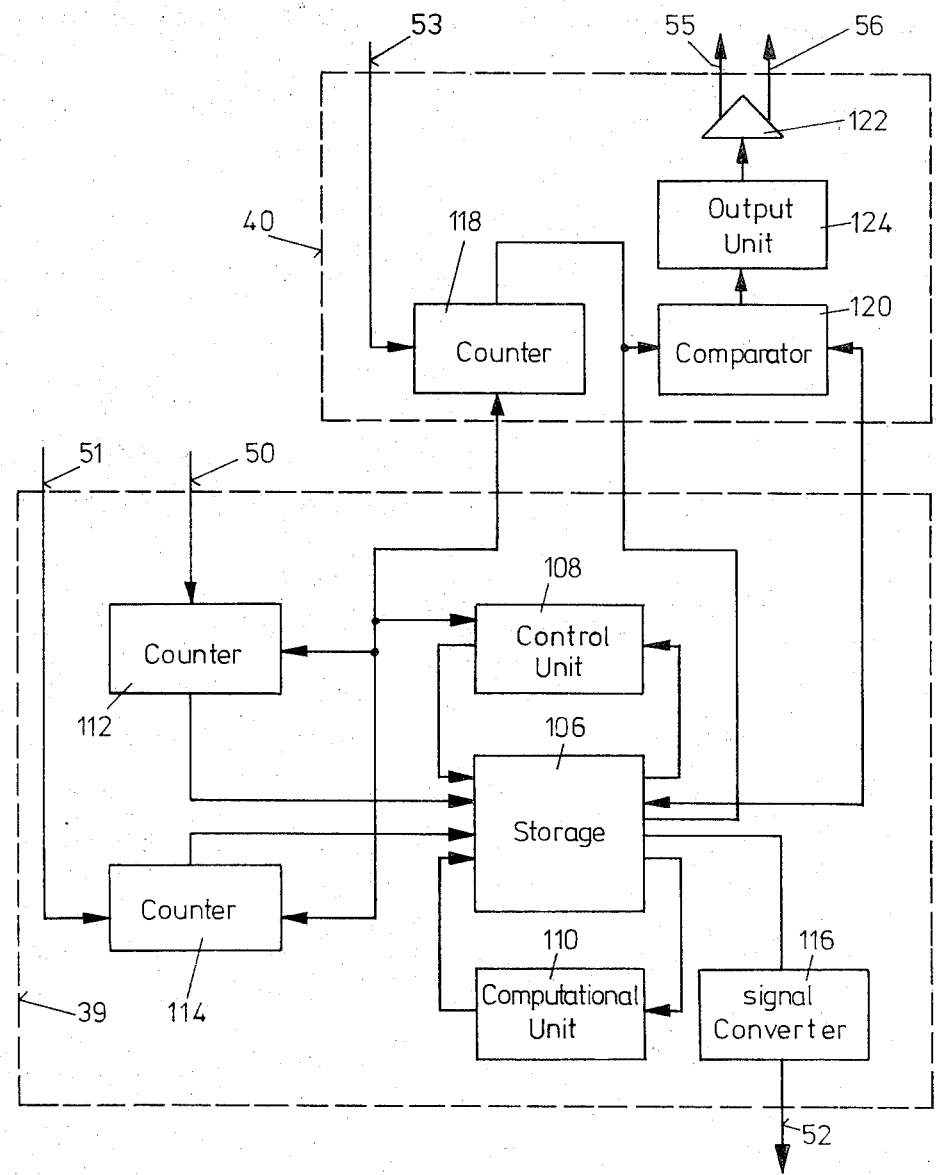
FIG. 3A is a diagram of the control circuits for the computer and electronic switch in FIG. 3.

While in the embodiment of FIGS. 1 and 1A the computer 9 has been shown as an analogue computer, in the embodiment of FIGS. 3 and 3A the computer 39 is shown as a digital computer. Computer 39 is characterized in that it processes digital information as commands and operands, computes as a program controlled installation and consists of a working storage 106, a control unit 108, a computational unit 110 input counter units 112 and 114 and signal converter 116.

In the working storage 106 the data to be processed, such as $\mu = f(n_2)/n_1$ as well as the program $M_2 = M_1 \cdot \mu$, have been stored as fixed values. The control unit 108 controls the flow of the program, decodes and modifies the operations stated in the command. In unit 110, the data is operated on in the manner dictated by the command from the working storage 106 and control unit 108. The computer itself operates in the closing line operation as real-time data processing.

The function of the digital computer is as follows:

A frequency of electric oscillations assigned to the torque $M_1$ is fed intermittantly to the counter 114 via line 51 (number of pulses per time unit). Likewise, a sequence of pulses taken from the speed sensor 48 assigned to the driving speed $n_1$ is fed to counter 112. Pulses accumulated per time unit in counters 112 and 114 are interrogated by the control unit 108 and are transferred to the working storage 106. The pulses dependent on the speed of travel and measured by means of a speed sensor 36 are fed via line 53 to counter 118. The accumulated count of pulses developing in counter 118 is interrogated by control unit 108 and stored in the working storage 106. The data read and firmly programmed into the working storage is now transferred in the customary manner by means of shift registers into the unit 110.

The result formed in the unit 110 corresponds to the multiplication $M_2 = {}_{M1} \cdot \mu$. The converter value (coefficient of increased torque) is found in a computing sequence preceding the multiplication of factors sequentially obtained from firmly programmed values $\mu = f(n_2)/n_1$ and the speed ratio $n_2/n_1$ that had been calculated. The value $M_2$ found herewith is returned to the working storage 106 and is at the disposal of the signal converter 116 until a new calculating cycle is carried out. The signal converter 116 controls the pressure control valve 43 in a known manner. In a separate calculating sequence the gear shifting point likewise is calculated by means of a function firmly programmed into the working storage 106 and is fed to the comparator 120 of the switch box 40 as a bit parallel information. The comparator 120 compares the sum in working storage 106 with the count in counting mechanism 118.

If the resulting speed of travel develops in the comparator 120 equally larger or equally smaller in comparison to the value in the working storage 106, then either valve 41 or valve 42 is switched via the amplifier 122 connecting the comparator to the connecting line 55 or 56 through output unit 124.

Regarding the preceding descriptions, it will be understood that the basic concept of drive ratio change control is based on engine torques and vehicle speed. The hydraulic and electrical components may be selected to suit various applications, e. g., solenoid operated or pressure operated solenoid controlled valves may be used. Any suitable computer is usable made in accordance with well known principles for effecting an output signal based on programming for a signal proportional to torque output of the fluid drive. Voltage generators have been found suitable for rpm measurement of $N_1$, $N_2$ and V, i.e., the sensors 6, 7, 8. Alternatively, pulse generators are usable where pulse frequency is proportional to rpm. Also, pulsing produced by cylinder firing is usable for engine speed measuring purposes.

What is claimed is:

1. In combination with a transmission having an engine driven fluid transmitter connected to a mechanical drive and a drive ratio control mechanism operatively connected to the mechanical drive, a system for effecting changes in the drive ratio of the mechanical drive comprising electrical means for developing a speed signal substantially proportional to the output speed of the fluid transmitter, input signal means for producing an input torque signal substantially proportional to input torque to the fluid transmitter, computer means programmed in accordance with operating characteristics of the fluid transmitter for producing an output torque signal in response to said input torque and speed signals, and control means responsive to said output torque signal of the computer means and output speed of the mechanical drive for selecting the drive ratio through said drive ratio control mechanism.

2. The combination of claim 1 wherein said drive ratio control mechanism includes a pressurized source of actuating fluid, valve means connected to the computer means for varying the pressure of the actuating fluid from the source in accordance with the output torque signal, and fluid pressure operated means to which the actuating fluid is delivered for changing the drive ratio in response to control signals from the control means.

3. The combination of claim 2 wherein the fluid transmitter includes an engine driven impeller and a driven turbine connected to the mechanical drive, said control means including a speed sensor driven by the mechanical drive and electronic switch means from which said control signals are developed in response to the output torque signal from the computer means and the output speed signal from the speed sensor.

4. The combination of claim 2 wherein the fluid transmitter includes an engine driven impeller and a driven turbine and signal processing means connected to the input signal means for producing said input torque signal as a variable function of the speed ratio between the turbine and impeller of the fluid transmitter.

5. The combination of claim 4 wherein the computer means is programmed in accordance with a function of the speed ratio between the turbine and impeller and the square of the speed of the turbine.

6. The combination of claim 4 wherein the computer means is programmed in accordance with a function of the speed ratio between the turbine and impeller and the square of the speed of the turbine.

7. In combination with a transmission having a fluid transmitter, change speed gearing and fluid pressure operated means for changing the drive ratio of the gearing; sensing means driven by the transmission for generating input signals, and data processing means programmed in accordance with operating characteristics of the fluid transmitter and connected to the sensing means for transforming the input signals into an anolog output controlling the fluid pressure operated means.

8. The combination of claim 7 wherein said fluid transmitter includes impeller and turbine elements and said analog output of the data processing means is a continuous function of the speed ratio between the turbine and impeller elements.

9. The combination of claim 8 wherein said data processing means includes an analog computer and the analog output thereof is a function of the square of the speed of the turbine element.

10. The combination of claim 8 wherein said data processing means includes a digital computer.

* * * * *